United States Patent
Chiao et al.

[11] Patent Number: 5,882,309
[45] Date of Patent: Mar. 16, 1999

[54] MULTI-ROW ULTRASONIC TRANSDUCER ARRAY WITH UNIFORM ELEVATOR BEAMWIDTH

[75] Inventors: Richard Yung Chiao, Clifton Park; Douglas Glenn Wildes, Ballston Lake, both of N.Y.

[73] Assignee: General Electric Company, Schenectady, N.Y.

[21] Appl. No.: 852,810

[22] Filed: May 7, 1997

[51] Int. Cl.[6] .................................................. A61B 8/00
[52] U.S. Cl. .......................................... 600/459; 310/336
[58] Field of Search .................................. 600/459, 455, 600/443; 310/334–337

[56] References Cited

U.S. PATENT DOCUMENTS

| | | | |
|---|---|---|---|
| 5,083,568 | 1/1992 | Shimazaki et al. | 128/662.03 |
| 5,115,810 | 5/1992 | Watanabe et al. | 600/459 |
| 5,167,231 | 12/1992 | Matsui | 600/459 |
| 5,301,168 | 4/1994 | Miller | 367/138 |
| 5,415,175 | 5/1995 | Hanafy et al. | 128/662.03 |
| 5,438,998 | 8/1995 | Hanafy | 128/662.03 |
| 5,488,956 | 2/1996 | Bartelt et al. | 600/459 |
| 5,546,946 | 8/1996 | Souquet | 600/459 |
| 5,651,365 | 7/1997 | Hanafy et al. | 600/459 |
| 5,740,806 | 4/1998 | Miller | 600/459 |

*Primary Examiner*—Francis J. Jaworski
*Attorney, Agent, or Firm*—Marvin Snyder; Douglas E. Stoner

[57] ABSTRACT

A multi-row ultrasound transducer array having a central row of transducer elements and a pair of outermost rows of transducer elements on opposing sides of the central row. The corresponding elements of the outermost rows are connected in parallel to a respective signal lead. The area of each element in the central row is less than the combined area of each pair of elements of the outermost rows. The greater total area of the combined elements of the outermost rows as compared to the area of each element of the central row provides improved elevation performance (thinner and more uniform image slice, greater contrast resolution), especially in the very near field, as compared to conventional transducers. The array may further include one or more pairs of rows of elements intermediate the central row and the respective outermost rows. The corresponding elements of the intermediate rows are connected in parallel to respective signal leads. The combined area of each pair of elements of the intermediate rows is less than the combined area of each pair of elements of the outermost rows, but greater than the area of a central row element.

20 Claims, 4 Drawing Sheets

MULTI-ROW ULTRASONIC TRANSDUCER ARRAY WITH UNIFORM ELEVATOR BEAMWIDTH

FIELD OF THE INVENTION

This invention relates to medical ultrasound imaging systems having a multi-row ultrasound transducer array. In particular, the invention relates to multi-row ultrasound transducer arrays which are steerable in the azimuth but not the elevation direction.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, a one-dimensional array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred vector direction and is focused at a selected point along the beam. Multiple firings may be used to acquire data representing the same anatomical information. The beam forming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer array is employed to receive the reflected sound (receiver mode). The voltages produced at the receiving transducers are summed so that the net signal is indicative of the ultrasound reflected from a single focal point in the object. As with the transmission mode, this focused reception of the ultrasonic energy is achieved by imparting a separate time delay (and/or phase shift) and gain to the signal from each receiving transducer.

Figure 1:
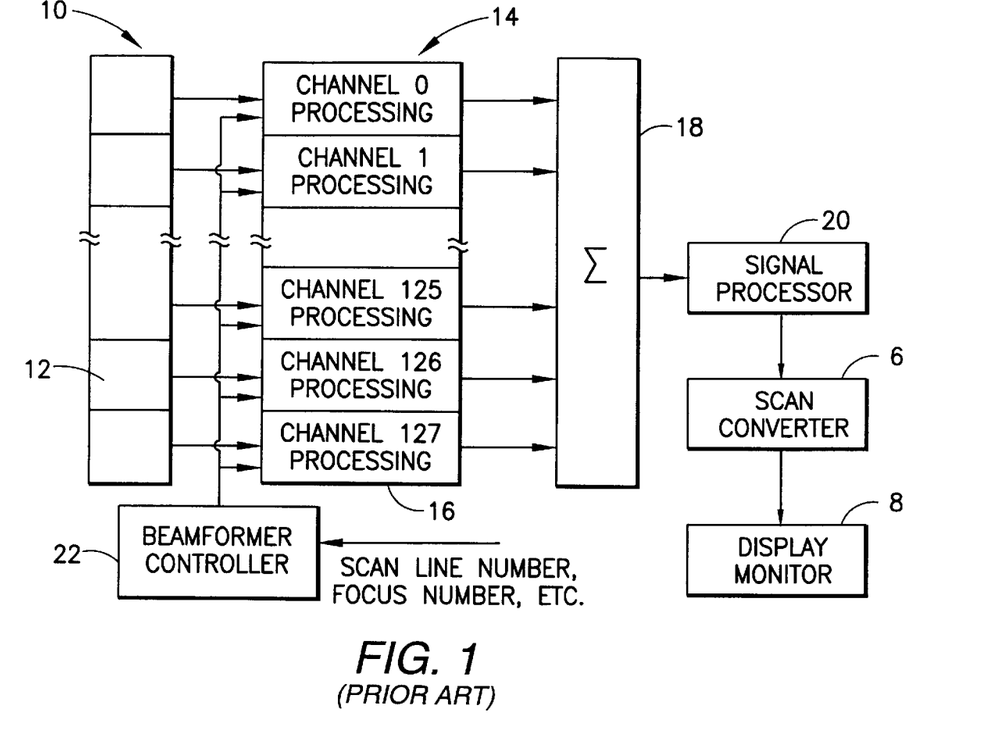
FIG. 1 is a block diagram of a typical 128-channel beamformer in a conventional ultrasound imaging system.

Referring to FIG. 1, a conventional ultrasound imaging system includes a transducer array 10 comprised of a plurality of separately driven transducer elements 12, each of which produces a burst of ultrasonic energy when energized by a pulsed waveform produced by a transmitter (not shown). The ultrasonic energy reflected back to transducer array 10 from the object under study is converted to an electrical signal by each receiving transducer element 12 and applied separately to a beamformer 14.

The echo signals produced by each burst of ultrasonic energy reflect from objects located at successive ranges along the ultrasonic beam. The echo signals are sensed separately by each transducer element 12 and the magnitude of the echo signal at a particular point in time represents the amount of reflection occurring at a specific range. Due to the differences in the propagation paths between an ultrasound-scattering sample volume and each transducer element 12, however, these echo signals will not be detected simultaneously and their amplitudes will not be equal. Beamformer 14 amplifies the separate echo signals, imparts the proper time delay to each, and sums them to provide a single echo signal which accurately indicates the total ultrasonic energy reflected from the sample volume. Each beamformer channel 16 receives the analog echo signal from a respective transducer element 12.

To simultaneously sum the electrical signals produced by the echoes impinging on each transducer element 12, time delays are introduced into each separate beamformer channel 16 by a beamformer controller 22. The beam time delays for reception are the same delays as the transmission delays. However, the time delay of each beamformer channel is continuously changing during reception of the echo to provide dynamic focusing of the received beam at the range from which the echo signal emanates. The beamformer channels also have circuitry (not shown) for apodizing and filtering the received pulses.

The signals entering the summer 18 are delayed so that when they are summed with delayed signals from each of the other beamformer channels 16, the summed signals indicate the magnitude and phase of the echo signal reflected from a sample volume located along the steered beam. A signal processor or detector 20 converts the received signal to display data. In the B-mode (grey-scale), this would be the envelope of the signal with some additional processing such as edge enhancement and logarithmic compression. The scan converter 6 receives the display data from detector 20 and converts the data into the desired image for display. In particular, the scan converter 6 converts the acoustic image data from polar coordinate (R-$\theta$) sector format or Cartesian coordinate linear array to appropriately scaled Cartesian coordinate display pixel data at the video rate. This scan-converted acoustic data is then output for display on display monitor 8, which images the time-varying amplitude of the envelope of the signal as a grey scale.

In most conventional transducer arrays the elements are arranged in a single row, spaced at a fine pitch (one-half to one acoustic wavelength on center). In the elevation direction (perpendicular to the array axis and imaging plane), single-row transducer elements are large (tens of wavelengths) and beam formation is provided by a fixed-focus acoustic lens. Conventional one-dimensional phased-array probes have excellent lateral and axial resolution, but their elevation performance is determined by a fixed aperture focused at a fixed range. The focal length of the lens is chosen to give maximum contrast resolution near the imaging range of greatest importance for the intended application of the probe. The elevation aperture is a tradeoff between contrast resolution and sensitivity near the lens focus (improved by a large aperture) and depth of field or contrast away from the focus (improved by a smaller aperture) The elevation aperture is typically $\frac{1}{6}$ to $\frac{1}{3}$ of the lens focus distance ($f/6$ to $f/3$), which gives good slice thickness (i.e., beamwidth in the plane perpendicular to the imaging plane, also referred to as "elevation beamwidth") and contrast resolution at the focus and a moderate depth of field. However, the near-field and far-field performance (elevation slice thickness and contrast resolution) of such a probe is significantly worse than the performance at the lens focus.

Various types of multi-row transducer arrays, including so-called "1.25D", "1.5D", and "2D" arrays, have been developed to improve upon the limited elevation performance of present single-row ("1D") arrays. As used herein, these terms have the following meanings: 1D) elevation aperture is fixed and focus is at a fixed range; 1.25D) elevation aperture is variable, but focusing remains static; 1.5D) elevation aperture, shading, and focusing are dynamically variable, but symmetric about the centerline of the array; and 2D) elevation geometry and performance are comparable to azimuth, with full electronic apodization, focusing, and steering. The elevation aperture of a 1.25D probe increases with range, but the elevation focusing of that aperture is static and determined principally by a mechanical lens with a fixed focus (or foci). 1.25D probes can provide substantially better near- and far-field slice thickness performance than 1D probes, and require no additional system beamformer channels. 1.5D probes use additional beamformer channels to provide dynamic focusing and apodization in elevation. 1.5D probes can provide detail resolution comparable to, and contrast resolution substantially better than, 1.25D probes, particularly in the mid- and far-field.

Figure 2A:
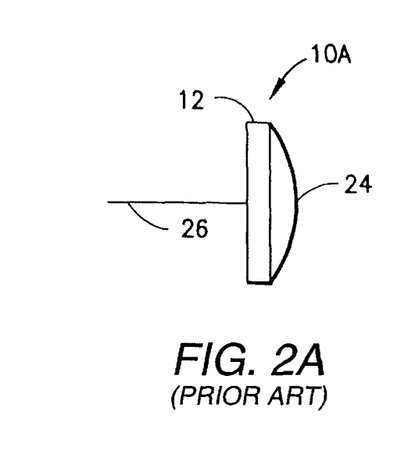
FIGS. 2A and 2B are elevation cross-sectional and frontal views, respectively, of a conventional 1D transducer array.
Figure 2B:
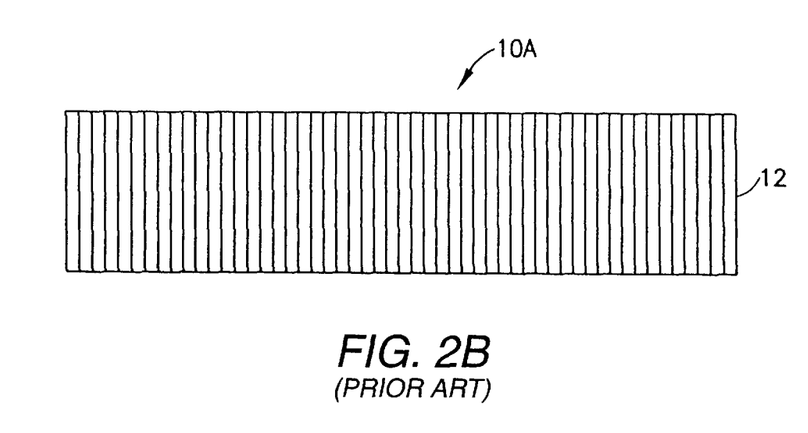

FIGS. 2A and 2B show a conventional 1D array 10A, with a single row of tall, narrow transducer elements 12. The ultrasound pulses are transmitted through a semi-cylindrical focusing lens 24. Each transducer element is connected to a separate beamforming channel 16 (see FIG. 1) by a respective electrical conductor 26.

Figure 3A:
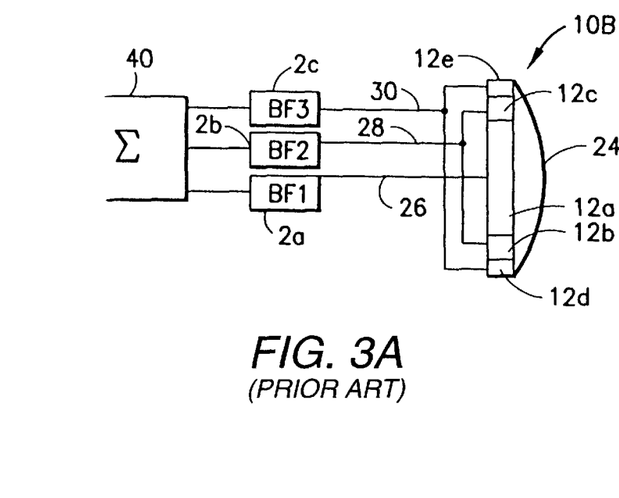
FIGS. 3A and 3B are elevation cross-sectional and frontal views, respectively, of a conventional multi-row transducer array with Fresnel row widths, single-focus lens and electrical connections for 1.5D beamforming.
Figure 3B:
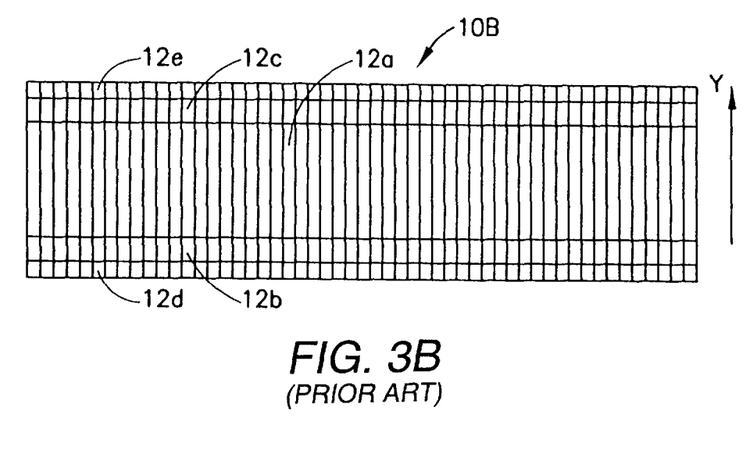

FIGS. 3A and 3B show a conventional 1.5D array 10B with Fresnel row pitch and five rows 12a–12e of transducer elements. The ultrasound pulses are again transmitted through a single-focus lens 24. For a 1.5D array with a single-focus lens 24, the Fresnel row pitch minimizes the worst-case phase error (focusing error) across the aperture. If the centerline of the array is defined to be y=0 and the outer edge to be y=$y_{max}$, then the row edges are at distances $((1/3)^{1/2}, (2/3)^{1/2}, 1)y_{max}$ from the centerline. The signal leads 26 from the central row transducer elements are brought out for connection to a first set of beamformer channels 2a. The array elements in rows other than the central row are electrically connected in pairs, symmetric across the centerline. Signals leads 28 from each pair of intermediate row transducer elements are brought out for connection to a second set of beamformer channels 2b. Similarly, signals leads 30 from each pair of outermost row transducer elements are brought out for connection to a third set of beamformer channels 2c. The beamformer channels 2a–2c provide independent time delays, apodization and filtering for each transducer element or pair of elements in 1.5D array 10B. The outputs of the beamformer channels are combined in summer 40, analogous to summer 18 of the 1D beamformer shown in FIG. 1.

Figure 4A:
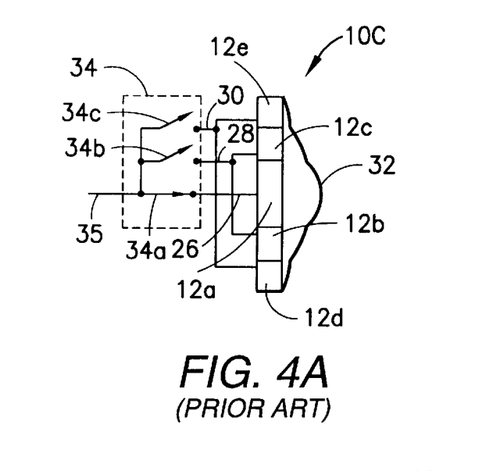
FIGS. 4A and 4B are elevation cross-sectional and frontal views, respectively, of a conventional multi-row transducer array with equal-area elements, multi-focus lens and electrical connections for 1.25D beamforming.
Figure 4B:
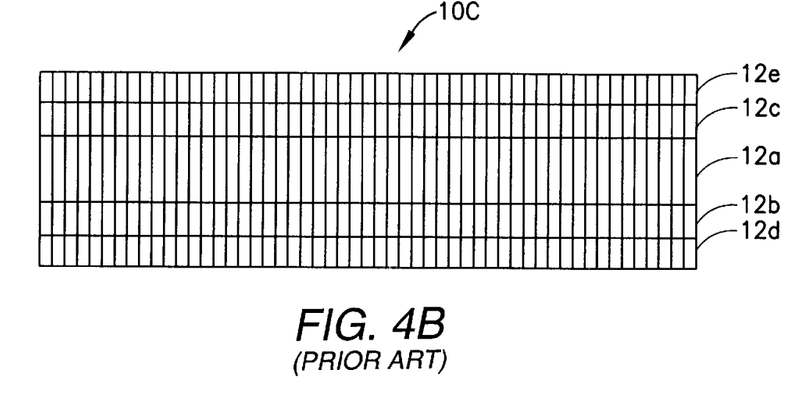

FIGS. 4A and 4B show a conventional 1.25D array 10C with five rows 12a–12e of equal-area transducer elements. In this case, the ultrasound pulses are transmitted through a multi-focus lens 32. The row edges are at distances (1/3, 2/3, 1)$y_{max}$ from the array centerline. For each elevational column, the paired elements from the outer rows have a summed area which is the same as the area of each element of the central row. Thus, the pairs of elements in the outer rows have the same electrical impedance and acoustic sensitivity as that of the central row elements. The multi-focus lens improves the uniformity of the elevation beam profile by focusing the central row in the near field, where only the central row is active, and the outer rows in the far field, which is the only region where they are active.

In the 1.25D array shown in FIG. 4A, a multiplicity of multiplexers 34 are respectively connected to a corresponding multiplicity of signal leads 35 (only one multiplexer and one signal lead are seen in FIG. 4A). Each signal lead 35 is connected to a respective beamformer channel (not shown in FIG. 4A). Each multiplexer 34 has three internal switches which multiplex signal leads 26, 28, and 30 to connect with signal lead 35. Each column of transducer elements is connected to a respective set of such signal leads: the central row element 12a being connected to signal lead 26; the paired elements 12b, 12c of the intermediate rows being connected in parallel to signal lead 28; and the paired elements 12d, 12e of the outermost rows being connected in parallel to signal lead 30. In practice, the pairing of elements (i.e., connection of 12b to 12c and of 12d to 12e) is accomplished within the probe head, whereas the multiplexers may be located within the probe head, at the console end of the probe cable or within the system console itself.

Because changing the state of the multiplexer switches generates noise, use of this probe typically requires three transmit-receive cycles per beam. With the multiplexer switches 34a for the center row of elements 12a closed and switches 34b and 34c open, the transmit delays are set to provide azimuthal focusing in the near field, and the near portion of the beam data is acquired. Next, switches 34a and 34b are closed, the transmit and receive delays are reconfigured, and the mid-field data is acquired using rows 12a, 12b and 12c. Finally, all the multiplexer switches are closed, the transmit and receive delays are reconfigured, and the far-field data is acquired using rows 12a–12e. Data from the three zones are spliced together in the imaging system, with care being taken to compensate for the change in sensitivity at the transition.

All multi-row 1.25D and 1.5D arrays (and annular arrays) known at present either have a large center and small outer rows, to reduce the phase error across the aperture in the far field, or have equal-area elements, so that all beamformer channels see the same electrical and acoustic impedance and all transducer elements have the same transmit and receive efficiency. The elevation height of the central rows of these transducers sets a lower bound on the near-field slice thickness and prevents these probes from achieving optimum contrast resolution in the very near field.

Thus there is a need for a transducer which provides excellent elevation performance (minimum slice thickness) throughout the imaging field. Preferably, such a transducer should be compatible with existing ultrasound imaging systems having 128 or fewer beamformer channels.

SUMMARY OF THE INVENTION

The present invention is a multi-row ultrasound transducer with center row(s) smaller than outer row(s) to provide improved elevation performance (thinner and more uniform image slice, greater contrast resolution), especially in the very near field, as compared to conventional transducers. In its broadest scope, the invention includes any multi-row transducer array in which the area of each element of the central row is less than the combined area of each pair of elements in any of the outer rows. In accordance with a preferred embodiment, the array has five rows and a multi-focal lens, the combined area of each pair of elements in the outermost rows being greater than the area of each element of the central row and greater than the combined area of each pair of elements in the intermediate rows. In accordance with another preferred embodiment, the array has only three rows and a bi-focal lens, the combined area of each pair of elements in the outer rows being greater than the area of each element of the central row. The array may also have more than five rows.

The present invention has application in both 1.25D and 1.5D arrays. For 1.25D and 1.5D arrays with relatively few rows, a smaller central row will generally improve the near-field resolution. If the multi-row transducer is used as a 1.25D array, then not only do small center row(s) improve the near field, but also large outer row(s), in conjunction with a multi-focus lens, provide improved elevation performance in the far field.

DETAILED DESCRIPTION OF THE PREFERRED EMBODIMENTS

In accordance with the present invention, optimum elevation performance (minimum image slice thickness and maximum contrast resolution) is achieved with a multirow transducer array having relatively shorter (in the elevation direction) central rows and relatively taller outermost rows. The outermost rows are also taller in the elevation direction than any intermediate rows.

Figure 6:
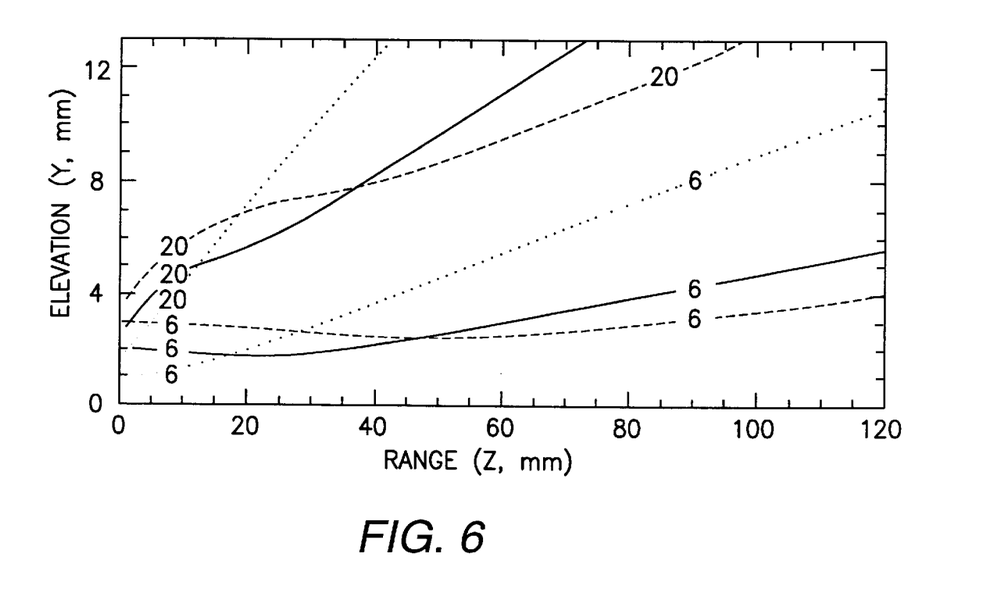
FIG. 6 is a graph showing elevation beam contours for unfocused apertures (5 MHz): 2-mm aperture (dotted lines); 4-mm aperture (solid lines); and 6-mm aperture (dashed lines). The –6 dB contour indicates detail resolution; the –20 dB contour shows contrast resolution.

In the very near field, only the central row of the array is active and the elevation performance is determined by the height of the central row. For 1.25D and 1.5D arrays with relatively few rows, a smaller central row will generally improve the near-field resolution. The lower bound on the size of the central row elements is either the increasing loss associated with coupling a small, high-impedance element through a long cable to the beamformer electronics or the diminishing near-field distance ($Z \approx d/4\lambda$) and increasing divergence of the beam (half-angle $\theta \approx \sin^{-1}(\lambda/d)$) due to diffraction as the size of the element approaches an acoustic wave-length. The tradeoff between these effects is illustrated in FIG. 6, which shows the elevation beam contours for unfocused apertures (5 MHz). The 2 mm aperture (dotted line) has the best resolution in the very near field, but the near-field distance is quite short ($\approx 3$ mm) and the beam diverges very rapidly thereafter. The 6 mm aperture (dashed line) has relatively uniform but not very good resolution over the entire range. A 4 mm aperture (solid line) offers good resolution over a significant fraction ($\approx 0$–30 mm) of the imaging range of the probe.

As the imaging depth increases from the near toward the far field, more of the rows of transducer elements become involved. To obtain uniform elevation performance over a maximum range, one would prefer to have the effective focal distance of the array increase as the active aperture increases. With a 1.25D array, all of the elevation focusing is provided by the acoustic lens. To increase the focal length as the aperture increases, a multi-focus lens is used. The portion of the lens which covers the central row of the array has a short focal length, for best near-field performance when only the central row is active. The outer portions of the lens have longer focal lengths for best far-field performance, since the outer rows of the array are only active in the far field of the image.

Increasing the size of the outermost rows of the array relative to the inner rows gives greater weight in the far field of the image to the outer segments of the lens. This will further increase the effectiveness of the multi-focus lens and further improve the elevation depth of field and performance of the transducer.

With a 1.5D array and beamformer, some of the elevation focusing is achieved dynamically by adjusting electronic time delays in the beamformer. The beamformer also allows dynamic amplitude shading in elevation, which helps suppress sidelobes on the beam. These effects are hampered by and may outweigh the advantages of large outer rows and a multi-focus lens. Designing an array for optimum electronic focusing and shading in the far field leads to large central rows and small outer rows. The relevance of this invention to a 1.5D array design will depend on the importance of the nearfield elevation performance of the probe relative to the far-field performance for the particular clinical application for which the probe is intended.

Many conventional multi-row transducer arrays have been designed with equal-area elements, so that all beamformer channels see the same electrical and acoustic impedance and all transducer elements have the same transmit and receive efficiency. However, most modern ultrasound imaging systems have transmit and receive apodization control (transmit amplitude and receive gain control) in their beamformers. This capability can be adapted or improved to compensate for variations in sensitivity, losses, and transmit/receive efficiency between the rows of a non-equal-area array. Therefore the non-uniform sensitivity and inverse apodization profile which might result from an uncompensated array which has small center and large outer rows should not be an issue when that array is connected to a properly designed imaging system.

Figure 5A:
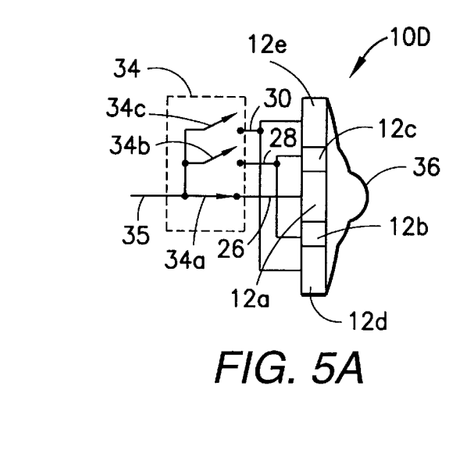
FIGS. 5A and 5B are elevation cross-sectional and frontal views, respectively, of a multi-row transducer array with relatively shorter (in the elevation direction) central rows and relatively taller outermost rows in accordance with the present invention.
Figure 5B:
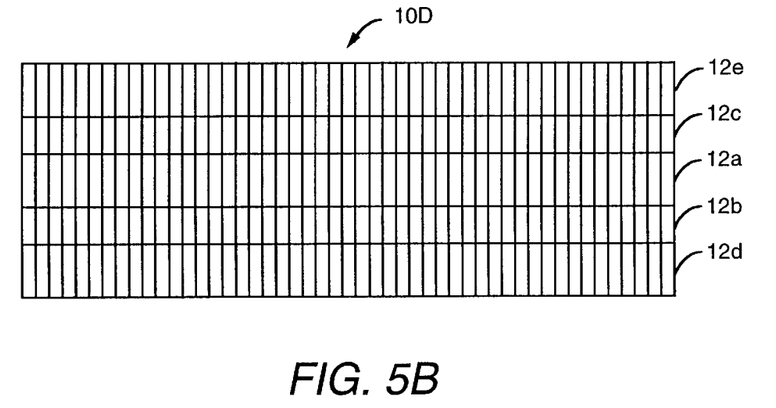

As one example of the application of the above array design principles, FIGS. 5A and 5B shows a 5-row 1.25D array with a small central row 12a and large outer-most rows 12d and 12e. The row edges are at distances $(\frac{1}{4}, \frac{1}{2}, 1)y_{max}$ from the array centerline. Thus, the paired elements of intermediate rows 12b and 12c have an area equal to the area of each element of central row 12a; the paired elements of outermost rows 12d and 12e have an area equal to twice the area of each element of central row 12a. The ultrasound pulses are transmitted through a multi-focus lens 36 having lens foci of 35, 65 and 90 mm. The central section of lens 36, having a 35-mm focal length, focuses the ultrasound beams transmitted by central row 12a; the adjacent lens sections (65-mm focal length) focus the beams respectively transmitted by rows 12b and 12c; and the outermost lens sections (90-mm focal length) focus the beams respectively transmitted by outermost rows 12d and 12e. The connection and operation of the multiplexers 34 is the same as that previously disclosed with reference to FIG. 4A.

The multi-focus lens 36 (see FIG. 5A) provides a delay function that is continuous across the elevation aperture but has a different curvature (focal length) for each row. Discontinuous delay functions are also possible, either by introducing discontinuities in the lens (which may cause diffraction artifacts) or by inserting static delay elements in the signal path between each row of elements and the multiplexer. The advantage of a multi-focus lens is that it substantially increases the depth of field, providing uniform resolution (−6 dB contour) and contrast (−20 dB contour) over essentially the entire imaging range of the probe. The disadvantage is that the sidelobes do not fall off quite as fast as those of a single-focus lens near its focal point.

Figure 7:
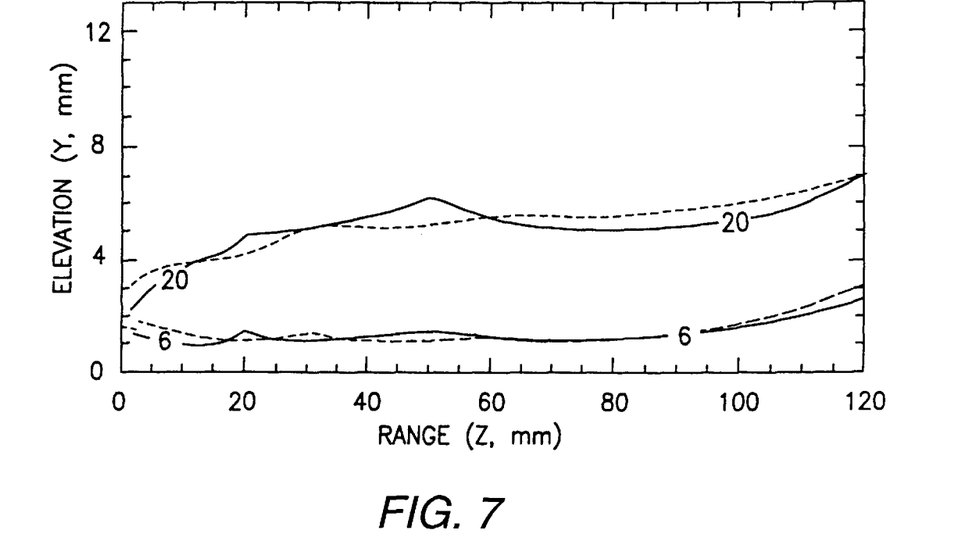
FIG. 7 is a graph showing elevation beam contours for a 5-row 1.25D (5 MHz) array with multi-focus lens and 12-mm aperture divided into equal-area rows (dashed lines) versus small center and large outer rows (solid lines). The small-center-row array has 35, 65 and 90 mm lens foci; the equal-area array has 40, 70 and 100 mm lens foci.

FIG. 7 compares elevation beam profiles from the small-central-row 1.25D array shown in FIG. 5A to beam profiles from the equal-area 1.25D array shown in FIG. 4A. The equal-area array has 40, 70 and 100 mm lens foci. The small-central-row design significantly improves the near-field performance of the 1.25D array. When combined with large outer rows and a multi-focus lens, the small-center-row design also provides modest improvement in the far field for the 1.25D array.

Figure 8:
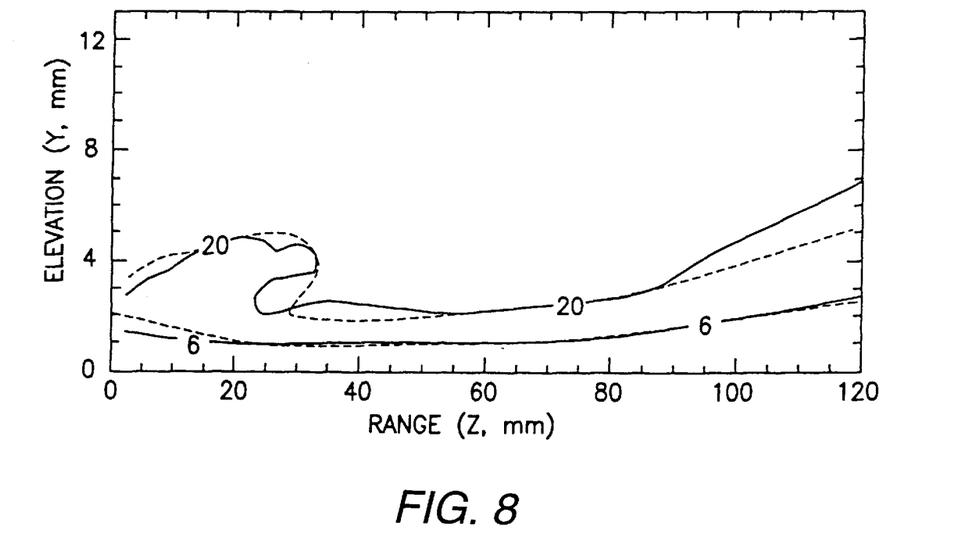
FIG. 8 is a graph showing elevation beam contours for a 5-row 1.5D (5 MHz) array with single-focus lens and 12-mm aperture divided into equal-area rows (dashed lines) versus small center and large outer rows (solid lines). The small-center-row array has a 70 mm lens focus; the equal-area array has a 65 mm lens focus.

FIG. 8 compares elevation beam profiles from a small-central-row 1.5D array to beam profiles for an equal-area 1.5D array (not shown). Both arrays have a single-focus lens. The small-central-row design significantly improves the near-field performance of the 1.5D array. However, for a 1.5D array, the small-center-row design causes broader sidelobes in the far field, so the choice between small-center-row and equal-area 1.5D arrays becomes a choice between near-field and far-field elevation performance.

Beam profile measurements and images confirm that multi-row arrays in accordance with the invention have an elevation slice thickness which is remarkably uniform over the entire imaging range of the array, and have an imaging performance which is substantially better than that of comparable 1D probes.

In accordance with variants of the preferred embodiments shown in FIGS. 4A and 5A, each transducer element in the central row 12a has a predetermined area, each pair of transducer elements in outer rows 12d and 12e have a first combined area greater than the predetermined area, and each pair of transducer elements in intermediate rows 12b and 12c have a second combined area greater than the predetermined area, but less than the first combined area.

Preferably, the array in accordance with the invention has n rows, where n is an odd number equal to three or more. The elements of each pair of rows on opposite sides of the central row may be switched such that the signals from adjacent rows can be applied to one set of beamformer channels. Alternatively, each pair of rows can be coupled to a separate set of beamformer channels. The beamformer typically uses a small aperture (e.g., central row only) to produce a beam in the near-field, then larger apertures (3, 5, 7, . . . rows) to produce beams in the mid- and far-fields. These beams are spliced together in a processor which is located between the beamformer and the image formation and display system.

The 1.25D design in accordance with the invention provides near-field and far-field performance (slice thickness ≈ contrast resolution) which is substantially better than that of conventional 1D probes, and does not require any additional system beamformer channels. Although the system impact is minimal, the improved imaging performance comes at the cost of a significant increase in the complexity of the transducer pallet, cable assembly and multiplexer. The increased elevation aperture and lens focal distance can contribute several dB to the probe's acoustic sensitivity in the far field; however, these gains may be offset by increased losses in the multiplexer and cable assembly.

In order to support dynamic elevation focusing, 1.5D arrays require many more beamforming channels and connections than 1.25D arrays. Elevational beam control for 1.25D arrays is accomplished only with a lens and a multiplexer. All elements within each elevational column of a 1.25D array are connected to the same beamforming channel and share the same electronic time delay and shading. In contrast 1.5D arrays use dynamic focusing and shading to control the elevational beam. With elevational symmetry (no steering), this requires an independent beamforming channel for each pair of elevational elements.

Thus the distinction between simple and compound lenses is less important for 1.5D than for 1.25D. In a 1.25D array the lens is the only focusing mechanism and having a compound lens is crucial for maintaining good detail and contrast resolution over an extended range. In a 1.5D array the electronic focusing and apodization are sufficiently effective that a compound lens provides little advantage over a simple lens. The lens focus should be near the center of the range of interest.

Simulations were used to generate the data depicted in FIGS. 6–8. These simulations assumed 128 channels for every row of the array. In practice, the allocation of channels to rows is an important design choice given the limited number of beamformer channels available. To preserve azimuthal performance, it is important that the active azimuthal aperture and element pitch of a 1.5D probe be comparable to those of the competitive 1D probes. Use of the full aperture of a three- or five-row 1.5D probe could therefore require two or three times the number of beamformer channels as are used by a comparable 1D probe.

This limitation can be overcome by using an elliptical active aperture to reduce the number of channels used by the outermost rows and produce a beam profile which is superior to the beam profile of a rectangular aperture. In addition, synthetic aperture techniques and multiple transmit-receive cycles may be used to obtain 256- or 512-channel performance from a 128-channel imager.

The foregoing preferred embodiments have been disclosed for the purpose of illustration. Variations and modifications will be readily apparent to those skilled in the design of multi-row ultrasonic transducer arrays. All such variations and modifications are intended to be encompassed by the claims set forth hereinafter.

We claim:

1. An ultrasonic transducer array comprising a first multiplicity of transducer elements arranged in a central row, a second multiplicity of transducer elements arranged in a first outer row, and a third multiplicity of transducer elements arranged in a second outer row, said central row being arranged between said first and second outer rows, a first multiplicity of signal leads respectively connected to said first multiplicity of transducer elements, and a second multiplicity of signal leads respectively connected to said second and third multiplicities of transducer elements, wherein each of said first multiplicity of transducer elements has a predetermined area different from the area of each of said second and third multiplicities of transducer elements and, each pair of said second and third multiplicities of transducer elements which are connected to a respective one of said second multiplicity of signal leads have a first combined area greater than said predetermined area, and means coupled to said signal leads for independently controlling connections to individual said elements of said array.

2. The ultrasonic transducer array as defined in claim 1, further comprising a focusing lens acoustically coupled to said central row and said first and second outer rows of transducer elements.

3. The ultrasonic transducer array as defined in claim 2, wherein said focusing lens comprises a first lens section having a first focal length and a second lens section having a second focal length greater than said first focal length, said first lens section being acoustically coupled to said central row of transducer elements, and said second lens section being acoustically coupled to said first and second outer rows of transducer elements.

4. The ultrasonic transducer array as defined in claim 1, further Comprising a fourth multiplicity of transducer elements arranged in a first intermediate row, a fifth multiplicity of transducer elements arranged in a second intermediate row, and a third multiplicity of signal leads coupled to said means for individually controlling connections and respectively connected to said fourth and fifth multiplicities of transducer elements, wherein said first intermediate row is between said central row and said first outer row, and said second intermediate row is between said central row and said second outer row.

5. The ultrasonic transducer array as defined in claim 4, wherein each pair of said fourth and fifth multiplicities of transducer elements which are connected to a respective one of said third multiplicity of signal leads have a second combined area greater than said predetermined area and less than said first combined area.

6. The ultrasonic transducer array as defined in claim 4, further comprising a focusing lens acoustically coupled to said central row, to said first and second intermediate rows, and to said first and second outer rows of transducer elements.

7. The ultrasonic transducer array as defined in claim 6, wherein said focusing lens comprises a first lens section having a first focal length, a second lens section having a second focal length greater than said first focal length, and a third lens section having a third focal length greater than said second focal length, said first lens section being acoustically coupled to said central row of transducer elements, said second lens section being acoustically coupled to said first and second intermediate rows of transducer elements, and said third lens section being acoustically coupled to said first and second outer rows of transducer elements.

8. An ultrasound imaging system comprising:
an ultrasound transducer array having a first multiplicity of transducer elements arranged in a central row, a second multiplicity of transducer elements arranged in a first outer row, and a third multiplicity of transducer elements arranged in a second outer row, said central row being between said first and second outer rows, a first multiplicity of signal leads respectively connected to said first multiplicity of transducer elements, and a second multiplicity of signal leads respectively connected to said second and third multiplicities of transducer elements, wherein each of said first multiplicity of transducer elements has a predetermined area different from the area of each of said second and third multiplicities of transducer elements, and each pair of said second and third multiplicities of transducer elements which are connected to a respective one of said second multiplicity of signal leads have a first combined area greater than said predetermined area;
a beamformer comprising a multiplicity of channels for forming transmit and receive beams;
a first multiplicity of switches for respectively connecting said first multiplicity of signal leads to said multiplicity of beamformer channels in a first switching state;
a second multiplicity of switches for respectively connecting said second multiplicity of signal leads to said multiplicity of beamformer channels in a second switching state;
means for processing receive beams from said beamformer to form an image; and
means for displaying said image.

9. The ultrasound imaging system as defined in claim 8, wherein said first multiplicity of switches also respectively connect said first multiplicity of signal leads to said multiplicity of beamformer channels in said second switching state.

10. The ultrasound imaging system as defined in claim 8, further comprising a focusing lens acoustically coupled to said central row and said first and second outer rows of transducer elements.

11. The ultrasound imaging system as defined in claim 10, wherein said focusing lens comprises a first lens section having a first focal length and a second lens section having a second focal length greater than said first focal length, said first lens section being acoustically coupled to said central row of transducer elements, and said second lens section being acoustically coupled to said first and second outer rows of transducer elements.

12. The ultrasound imaging system as defined in claim 8, further comprising a fourth multiplicity of transducer elements arranged in a first intermediate row, a fifth multiplicity of transducer elements arranged in a second intermediate row, and a third multiplicity of signal leads respectively connected to said fourth and fifth multiplicities of transducer elements, wherein said first intermediate row is between said central row and said first outer row, and said second intermediate row is between said central row and said second outer row.

13. The ultrasound imaging system as defined in claim 12, wherein each pair of said fourth and fifth multiplicities of transducer elements which are connected to a respective one of said third multiplicity of signal leads have a second combined area greater than said predetermined area and less than said first combined area.

14. The ultrasound imaging system as defined in claim 12, further comprising a focusing lens acoustically coupled to said central row, to said first and second intermediate rows, and to said first and second outer rows of transducer elements.

15. The ultrasound imaging system as defined in claim 14, wherein said focusing lens comprises a first lens section having a first focal length, a second lens section having a second focal length greater than said first focal length, and a third lens section having a third focal length greater than said second focal length, said first lens section being acoustically coupled to said central row of transducer elements, said second lens section being acoustically coupled to said first and second intermediate rows of transducer elements, and said third lens section being acoustically coupled to said first and second outer rows of transducer elements.

16. An ultrasound imaging system comprising:
an ultrasound transducer array having a first multiplicity of transducer elements arranged in a central row, a second multiplicity of transducer elements arranged in a first outer row, and a third multiplicity of transducer elements arranged in a second outer row, said central row being between said first and second outer rows, a first multiplicity of signal leads respectively connected to said first multiplicity of transducer elements, and a second multiplicity of signal leads respectively connected to said second and third multiplicities of transducer elements, wherein each of said first multiplicity of transducer elements has a predetermined area different from the area of each of said second and third multiplicities of transducer elements, and each pair of said second and third multiplicities of transducer elements which are connected to a respective one of said second multiplicity of signal leads have a first combined area greater than said predetermined area;

a first multiplicity of beamformer channels for forming a receive beam from electrical pulses carried by said first multiplicity of signal leads;

a second multiplicity of beamformer channels for forming a receive beam from electrical pulses carried by said second multiplicity of signal leads;

means for processing receive beams from at least said first and second multiplicities of beamformer channels to form an image; and means for displaying said image.

17. The ultrasound imaging system as defined in claim 16, further comprising a focusing lens acoustically coupled to said central row and said first and second outer rows of transducer elements.

18. The ultrasound imaging system as defined in claim 16, further comprising a fourth multiplicity of transducer elements arranged in a first intermediate row, a fifth multiplicity of transducer elements arranged in a second intermediate row, a third multiplicity of signal leads respectively connected to said fourth and fifth multiplicities of transducer elements, and a third multiplicity of beamformer channels for forming a receive beam from electrical pulses carried by said third multiplicity of signal leads, wherein said first intermediate row is between said central row and said first outer row, and said second intermediate row is between said central row and said second outer row, and said receive beam processing means process receive beams from at least said first, second and third multiplicities of beamformer channels to form an image.

19. The ultrasound imaging system as defined in claim 18, further comprising a focusing lens acoustically coupled to said central row, to said first and second outer rows, and to said first and second intermediate rows of transducer elements.

20. The ultrasound imaging system as defined in claim 18, wherein each pair of said fourth and fifth multiplicities of transducer elements which are connected to a respective one of said third multiplicity of signal leads have a second combined area greater than said predetermined area and less than said first combined area.

* * * * *